United States Patent
Tang et al.

(10) Patent No.: US 10,120,156 B2
(45) Date of Patent: Nov. 6, 2018

(54) LENS MODULE

(71) Applicant: SZ DJI TECHNOLOGY CO., LTD., Shenzhen (CN)

(72) Inventors: Yin Tang, Shenzhen (CN); Feihu Yang, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 2 days.

(21) Appl. No.: 15/125,525

(22) PCT Filed: Jun. 6, 2014

(86) PCT No.: PCT/CN2014/079352
§ 371 (c)(1),
(2) Date: Sep. 12, 2016

(87) PCT Pub. No.: WO2015/184633
PCT Pub. Date: Dec. 10, 2015

(65) Prior Publication Data
US 2017/0160512 A1    Jun. 8, 2017

(51) Int. Cl.
*G02B 7/02* (2006.01)
*G02B 7/00* (2006.01)

(52) U.S. Cl.
CPC ............ *G02B 7/026* (2013.01); *G02B 7/006* (2013.01); *G02B 7/022* (2013.01)

(58) Field of Classification Search
CPC ..................................................... G02B 7/021
(Continued)

(56) References Cited

U.S. PATENT DOCUMENTS

2009/0059398 A1   3/2009  Tsai et al.
2011/0090581 A1*  4/2011  Lee .................. G02B 7/022
                                                          359/829

FOREIGN PATENT DOCUMENTS

CN    101923200    12/2010
CN    102043223     5/2011
(Continued)

OTHER PUBLICATIONS

International Search Report dated Feb. 27, 2015, in corresponding International Application No. PCT/CN2014/079352 issued by the State Intellectual Property Office of the P.R. China; 6 pages.

*Primary Examiner* — James Jones
(74) *Attorney, Agent, or Firm* — Finnegan, Henderson, Farabow, Garrett & Dunner, LLP

(57) ABSTRACT

The present invention discloses a lens module, which includes a base, an elastic element, an optical lens, and a receiving element. The base includes a bottom portion and an extension portion extending vertically along the bottom portion. A stepped surface is formed where the bottom portion is connected with the extension portion. An internal thread is formed on an inner wall of the extension portion. The elastic element is disposed on the stepped surface. The receiving element is used for receiving the optical lens. The receiving element includes a threaded portion and a receiving portion connected with the threaded portion. The threaded portion is provided with an external thread. The external thread matches with the internal thread. The external thread connects the internal thread by threading to connect the receiving element with the base by threading. The elastic element abuts against the threaded portion to provide a pretightening force for the receiving element.

17 Claims, 4 Drawing Sheets

(58) Field of Classification Search
USPC .......................................................... 359/726
See application file for complete search history.

(56) References Cited

FOREIGN PATENT DOCUMENTS

| | | |
|---|---|---|
| CN | 102231002 | 11/2011 |
| CN | 203658405 | 10/2014 |
| JP | 2002-098878 | 4/2002 |
| JP | 2007-155760 | 6/2007 |
| JP | 2011-077927 | 4/2011 |
| JP | 52-88041 | 9/2013 |

* cited by examiner

LENS MODULE

CROSS REFERENCE TO RELATED APPLICATIONS

This application is a national phase application of International Application No. PCT/CN2014/079352, filed Jun. 6, 2014, the content of which is incorporated herein by reference in its entirety.

BACKGROUND OF THE INVENTION

The present invention relates to a lens module.

As the photography technology becomes mature and sophisticated, requirements for photography become increasingly higher. Filters, such as UV filters, portrait filters, diffusion filters, and starlight filters, used as an auxiliary in professional photography have already been applied widely to amateur photography. As a result, people can capture highlights whenever and wherever possible by using the equipment very conveniently. The existing fixed mode of the filters is mainly applied to ordinary handheld cameras, and the lens would loosen and come off due to vibration if applied to an aerial vehicle, which may affect the shooting.

BRIEF SUMMARY OF THE INVENTION

A technical problem to be mainly solved in the present invention is to provide a lens module that can solve the problem of loosening and coming off due to vibration.

To solve the foregoing technical problem, a technical solution adopted in the present invention is as follows. A lens module is provided, including: a base, which includes a bottom portion and an extension portion extending vertically along the bottom portion, with a stepped surface being formed where the bottom portion is connected with the extension portion, and an internal thread being formed on an inner wall of the extension portion; an elastic element disposed on the stepped surface; an optical lens; and a receiving element used for receiving the optical lens, the receiving element including a threaded portion and a receiving portion connected with the threaded portion, the threaded portion being provided with an external thread, the external thread matching with the internal thread, the external thread being connected with the internal thread by threading to connect the receiving element with the base by threading, and the elastic element abutting against the threaded portion to provide a pretightening force for the receiving element.

The sum of the height of the threaded portion along a direction perpendicular to the stepped surface and the height of the elastic element along the direction perpendicular to the stepped surface is greater than the height of the extension portion along the direction of the stepped surface.

Both the bottom portion and the extension portion are ring-like, and the extension portion and the bottom portion are integrally formed.

The lens module further includes an abutting member. The abutting member is received in the extension portion and fixed to the stepped surface, and the abutting member is disposed between the optical lens and the stepped surface.

The height of the abutting member along a direction perpendicular to the stepped surface is equal to a distance from the optical lens to the stepped surface, and a top surface of the abutting member away from the stepped surface abuts against the optical lens.

The lens module further includes multiple bolts. The bottom portion is provided with multiple threaded holes. An outer wall of the abutting member is provided with multiple threaded studs in a manner of being corresponding to positions of the multiple threaded holes. The multiple threaded bolts, each corresponding to one of the threaded holes, are connected with the respective threaded studs by threading to fix the abutting member onto the stepped surface.

Two sides of each of the threaded holes are provided with a positioning column respectively, and each of the threaded studs is located between two of the positioning columns.

The abutting member is fixed onto the stepped surface by glue.

An inner wall of the abutting member includes an inclined face. The diameter of the inclined face gradually decreases from one end away from the stepped surface to the other end close to the stepped surface, and the inclined face is provided with multiple decorative steps.

A circular first opening is formed on the bottom portion. The abutting member is a hollow ring-like structure, which includes a circular second opening. The diameter of the second opening is less than that of the first opening. The diameter of one end of the inclined face away from the stepped surface is greater than the diameter of the second opening and the diameter of the first opening, but is less than the inner diameter of the extension portion, and the diameter of one end of the inclined face close to the stepped surface is less than the diameter of the second opening and the diameter of the first opening.

The elastic element abuts against the inner wall of the extension portion.

The elastic element is made of rubber.

One end of the receiving portion away from the threaded portion is provided with a third opening. One end of the receiving portion close to the third opening is provided with a first receiving groove, and the first receiving groove is used for receiving the optical lens.

The end of the receiving portion close to the third opening is further provided with a second receiving groove. The first receiving groove is in communication with the second receiving groove. The lens module further includes a gasket, and the gasket is received in the second receiving groove and at the same time abuts against the optical lens.

The thickness of the optical lens is equal to the depth of the first receiving groove, and the thickness of the gasket is equal to the depth of the second receiving groove.

The gasket is made of a metal material and is provided with a notch.

The lens module is disposed on an unmanned aerial vehicle.

The optical lens is a filter.

The present invention has the following beneficial effects. As different from the situation in the prior art, in the lens module according to the present invention, the elastic element abuts against the threaded portion and is used for providing a pretightening force for the receiving element. Therefore, the receiving element can be prevented from loosening and coming off during vibration. At the same time, as the extension portion of the base is provided with an internal thread, and the external thread is connected with the internal thread of the extension portion by threading, the volume of the receiving element can be effectively reduced and the manufacturing cost is reduced.

Other objects and features of the present invention will become apparent by a review of the specification, claims, and appended figures.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings briefly described herein.

DETAILED DESCRIPTION OF THE INVENTION

The technical solution in embodiments of the present invention is clearly and completely described below with reference to the accompanying drawings of the embodiments of the present invention. It is apparent that the embodiments described are merely some embodiments of the present invention instead of all the embodiments. Based on the embodiments in the present invention, all other embodiments obtained by persons of ordinary skill in the art without making creative efforts should fall within the protection scope of the present invention.

Figure 1:
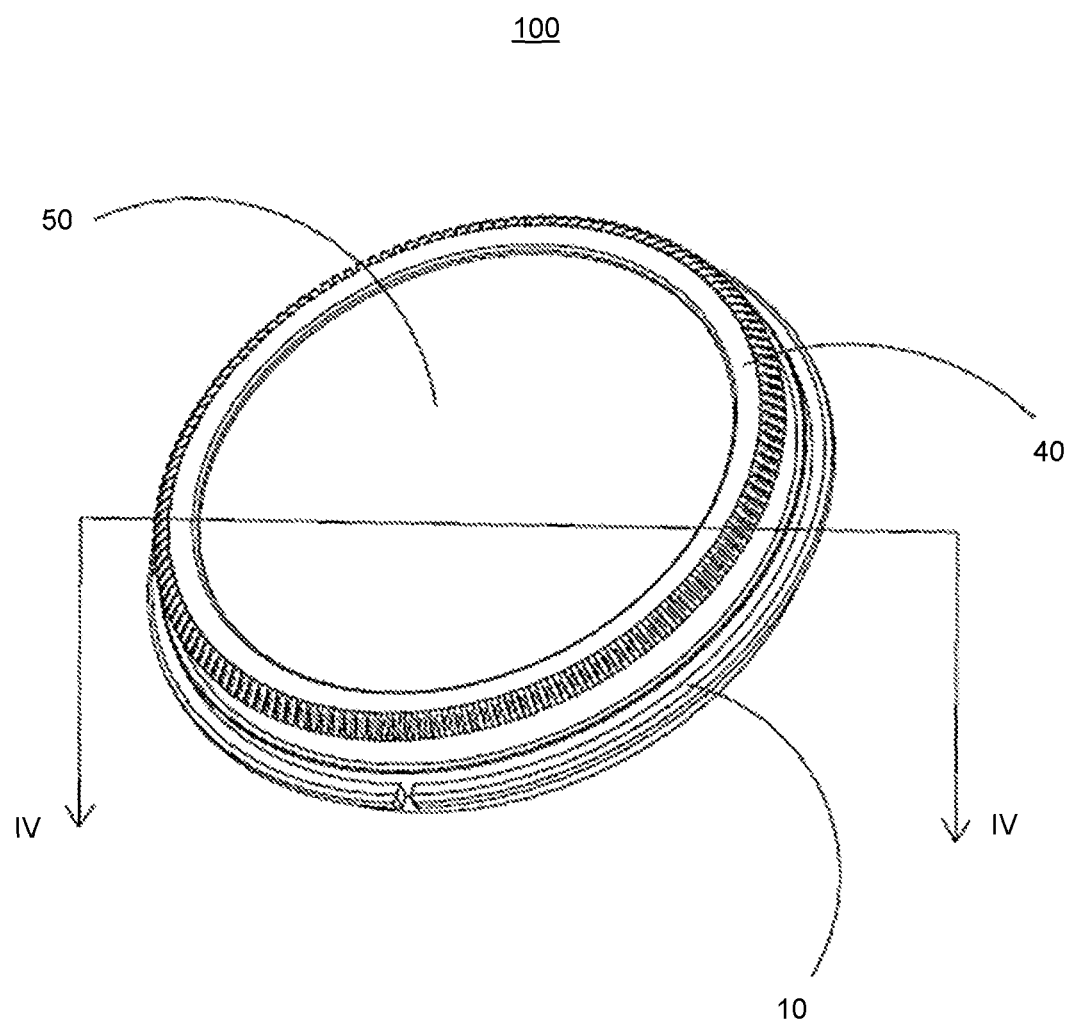
FIG. 1 is a schematic three-dimensional assembly diagram of a lens module according to an embodiment of the present invention.
Figure 2:
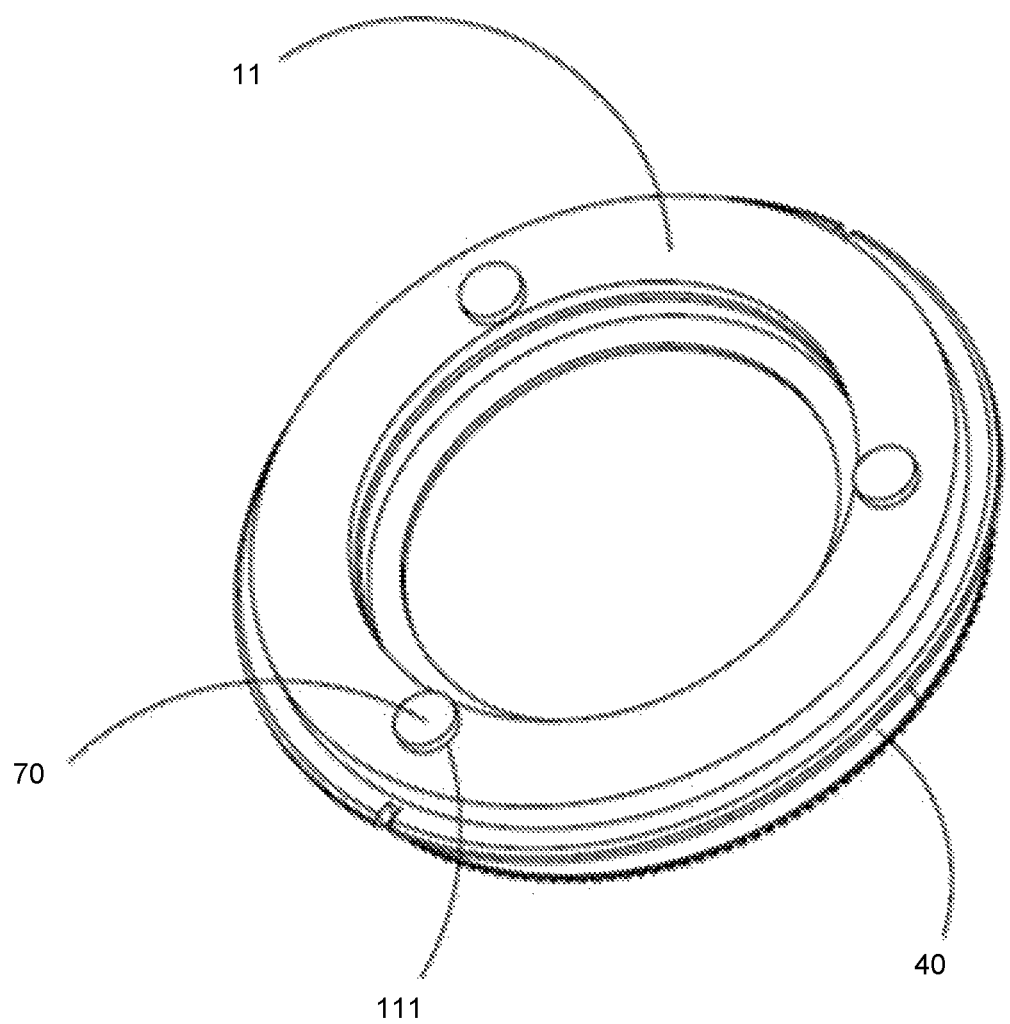
FIG. 2 is a schematic diagram of another perspective view of the lens module in FIG. 1.
Figure 3:
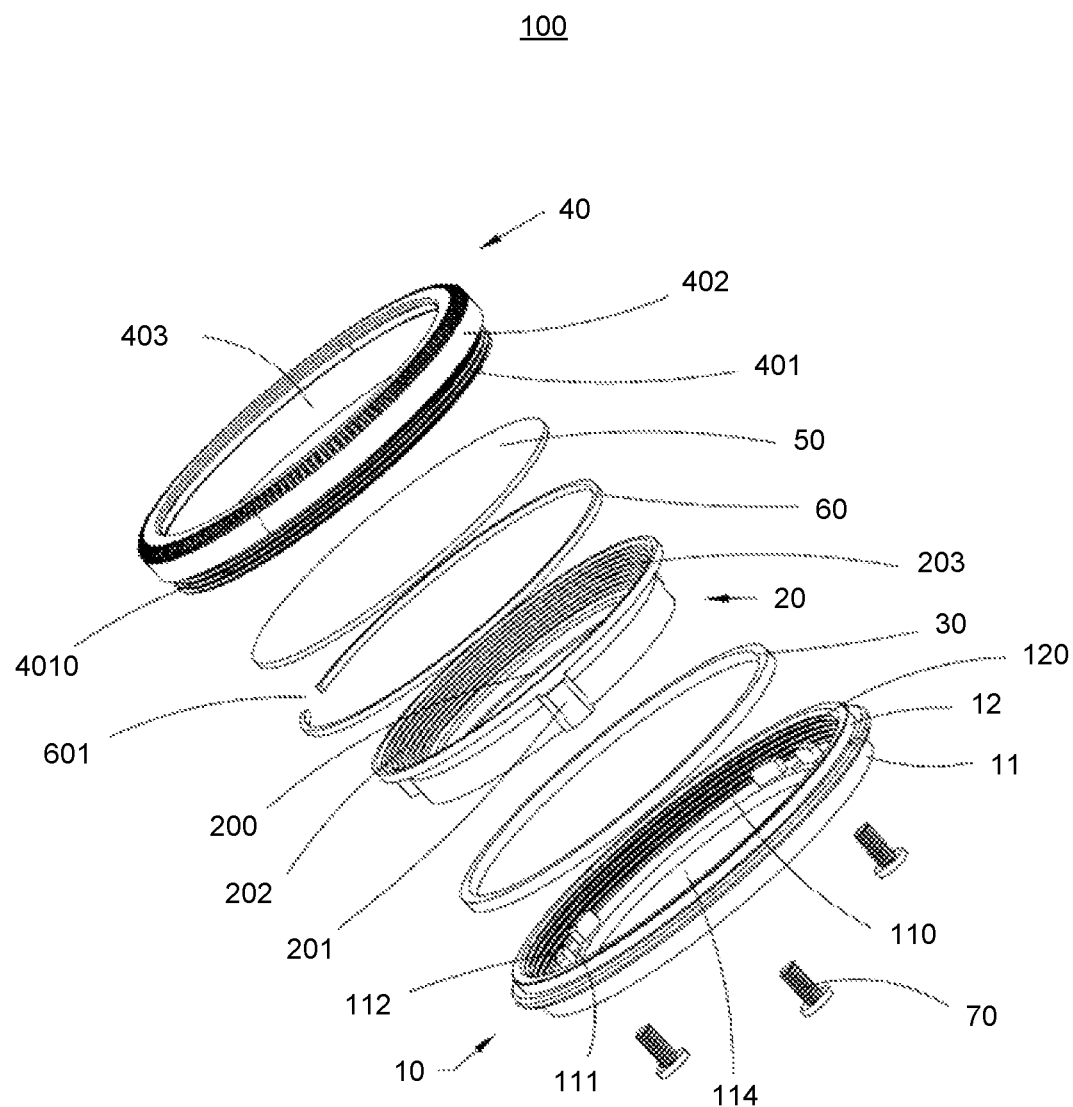
FIG. 3 is a schematic three-dimensional exploded diagram of the lens module in FIG. 1.
Figure 4:
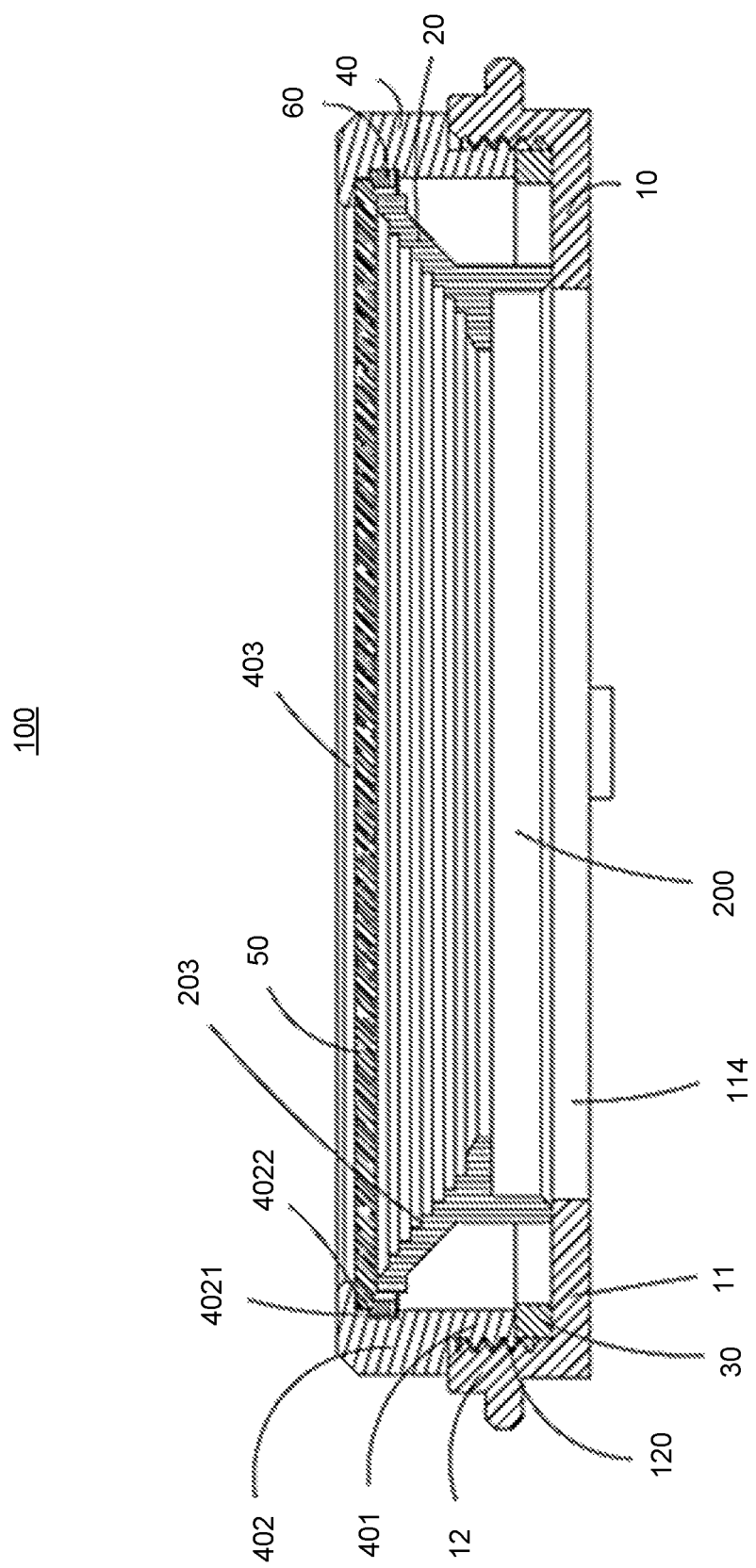
FIG. 4 is a sectional diagram of the lens module in FIG. 1 along a line IV-IV.

Referring to FIGS. 1-4 together, a lens module 100 according to an embodiment of the present application is disposed on an unmanned aerial vehicle (not shown). The unmanned aerial vehicle can be used as an auxiliary device for photographing, taking pictures, monitoring, and sampling, and it can be carried in an air-based field (for example, a rotor aircraft or a fixed wing aircraft), a water-based field (for example, a submarine or a ship), a land-based field (for example, a motor vehicle) or a space-based field (for example, a satellite, a space station, or a spaceship) and the like. The unmanned aerial vehicle includes a gimbal and a carried object carried on the gimbal. The gimbal is used to achieve fixing of the carried object, randomly adjust attitude of the carried object (for example, changing the height, tilt angle and/or direction of the carried object), and stably maintain the carried object on the determined attitude. The carried object may be a photographic device such as a camera and a video camera, which includes the lens module 100.

The lens module 100 includes a base 10, an abutting member 20, an elastic element 30, a receiving element 40, an optical lens 50, and a gasket 60. The abutting member 20 and the elastic element 30 are received in the base 10. The gasket 60 and the optical lens 50 are both received in the receiving element 40, and the receiving element 40 is connected with the base 10 by threading and abuts against the elastic element 30.

The base 10 is hollow and cylindrical, which includes a ring-like bottom portion 11 and an extension portion 12 extending vertically along the bottom portion 11. The extension portion 12 is also ring-like. In this embodiment, the extension portion 12 is integrally formed with the bottom portion 11. The radius of the extension portion 12 is greater than that of the bottom portion 11, and thus a stepped surface 110 is formed where the bottom portion 11 is connected with the extension portion 12. The bottom portion 11 is provided with three threaded holes 111. On the stepped surface 110, corresponding to the three threaded holes 111, two sides of each of the threaded holes 111 are provided with a positioning column 112 respectively. In this embodiment, the positioning column 112 is integrally formed with the bottom portion 11. A circular first opening 114 is formed in the bottom portion 11.

It can be understood that, in other embodiments, the number of the threaded holes 111 is not limited to three, and may be set according to needs to two or more than three, for example.

It can be understood that, in other embodiments, all the six positioning columns 112 can be omitted to save the manufacturing cost.

In this embodiment, an internal thread 120 is formed on an inner wall of the extension portion 12.

The abutting member 20 is also a hollow and cylindrical structure, which includes a circular second opening 200. In this embodiment, the diameter of the second opening 200 is less than that of the first opening 114. An outer wall of the abutting member 20 is provided with three threaded studs 201 in a manner of being corresponding to the three threaded holes 111. The abutting member 20 is installed to the stepped surface 110. An inner wall of the abutting member 20 includes an inclined face 202, and the diameter of the inclined face 202 gradually decreases from one end that is away from the stepped surface 110 to the other end that is close to the stepped surface 110. The inclined face 202 is provided with multiple decorative steps 203. The diameter of one end of the inclined face 202 away from the stepped surface 110 is greater than the diameter of the second opening 200 and the diameter of the first opening 114, but is less than the inner diameter of the extension portion 12. The diameter of one end of the inclined face 202 close to the stepped surface 110 is less than the diameter of the second opening 200 and the diameter of the first opening 114.

It can be understood that the number of the threaded studs 201 corresponds to that of the threaded holes 111, and may also be set to two or more than three.

The elastic element 30 is made of a rubber material. In this embodiment, the diameter of the elastic element 30 is greater than that of the first opening 114 and is substantially equal to the inner diameter of the extension portion 12. The elastic element 30 is disposed on the stepped surface 110 and abuts against the inner wall of the extension portion 12.

It can be understood that the elastic element 30 may also be made of another elastic material, which is not limited to this embodiment.

The receiving element 40 includes a threaded portion 401 and a receiving portion 402 connected with the threaded portion 401. The receiving element 40 is connected with the extension portion 12 by threading. Specifically, the threaded portion 401 is provided with an external thread 4010, and the external thread 4010 matches with the internal thread 120. The sum of the height of the threaded portion 401 along a direction perpendicular to the stepped surface 110 and the height of the elastic element 30 along the direction perpendicular to the stepped surface 110 is slightly greater than the height of the extension portion 12 along the direction of the stepped surface 110. The external thread 4010 of the threaded portion 401 is connected with the internal thread 120 of the extension portion 12 by threading, and the elastic element 30 provides a pretightening force. As the lens module 100 of this embodiment is disposed on the unmanned aerial vehicle, the receiving element 40 can be prevented from loosening and coming off during vibration.

In this embodiment, the receiving element 40 is provided with an external thread 4010, the extension portion 12 of the base 10 is provided with an internal thread 120, and the external thread 4010 is connected with the internal thread 120 of the extension portion 12 by threading. This can effectively reduce the volume of the receiving element 40 and reduce the manufacturing cost.

One end of the receiving portion 402 away from the threaded portion 401 is provided with a third opening 403. One end of the receiving portion 402 close to the third opening 403 is provided with a first receiving groove 4021 and a second receiving groove 4022. The first receiving groove 4021 is in communication with the second receiving groove 4022. The diameter of the first receiving groove 4021 is slightly greater than that of the second receiving groove 4022.

In this embodiment, the optical lens 50 is a filter. The thickness of the optical lens 50 is substantially equal to the depth of the first receiving groove 4021, and the optical lens 50 is received in the first receiving groove 4021.

The gasket 60 is made of a metal material. In this embodiment, the gasket 60 is made of aluminum. In order to make it easy to install the gasket 60 to the second receiving groove 4022, the gasket 60 is provided with a notch 601. The thickness of the gasket 60 is substantially equal to the depth of the second receiving groove 4022. The gasket 60 is received in the second receiving groove 4022 and at the same time abuts against the optical lens 50. The inner diameter of the gasket 60 is greater than the diameter of one end of the inclined face 202 away from the stepped surface 110.

It can be understood that the gasket 60 may also be made of another metal material, which is not limited to this embodiment.

In this embodiment, the lens module 100 further includes three bolts 70, and the number of the bolts 70 corresponds to that of the threaded studs 201. During assembly, the abutting member 20 first abuts against the stepped surface 110 of the base 10, each of the threaded studs 201 is located between two of the positioning columns 112 to make each of the threaded studs 201 aligned with one of the threaded holes 111. Then, three of the bolts 70 are, each corresponding to one of the threaded holes 111, connected with the respective threaded studs 201 by threading to make the abutting member 20 fixed onto the stepped surface 110 and received in the extension portion 12 at the same time. Then, the elastic element 30 is disposed on the stepped surface 110, and the elastic element 30 is sandwiched between the threaded studs 201 and the inner wall of the extension portion 12. Afterwards, the optical lens 50 is disposed in the first receiving groove 4021, and the gasket 60 is disposed in the second receiving groove 4022 and abuts against the optical lens 50 to make the optical lens 50 abut against the first receiving groove 4021. Finally, the external thread 4010 of the receiving element 40 is connected with the internal thread 120 of the extension portion 12 by threading to connect the receiving element 40 with the base 10 by threading, and the threaded portion 401 of the receiving element 40 abuts against the elastic element 30. As the abutting member 20 is disposed between the optical lens 50 and the stepped surface 110, and the height of the abutting member 20 along the direction perpendicular to the stepped surface 110 is equal to the distance from the optical lens 50 to the stepped surface 110, a top surface of the abutting member 20 away from the stepped surface 110 abuts against the optical lens 50, and the elastic element 30 provides a pretightening force for the receiving element 40.

It can be understood that, in other embodiments, it is also feasible to directly fix the abutting member 20 onto the stepped surface 110 by glue, which is not limited to this embodiment.

It can be understood that, in an actual application, the abutting member 20 may also be omitted, which is not limited to this embodiment.

In the lens module according to the present invention, the elastic element abuts against the threaded portion to provide a pretightening force for the receiving element. Therefore, the receiving element can be prevented from loosening and coming off during vibration. At the same time, as the extension portion of the base is provided with an internal thread, and the external thread is connected with the internal thread of the extension portion by threading, the volume of the receiving element can be effectively reduced and the manufacturing cost is reduced.

The above descriptions are merely embodiments of the present invention, and are not intended to limit the patent scope of the present invention. Any equivalent structure or equivalent process variation made by using contents of the specification and the drawings of the present invention, or directly or indirectly applied to other related technical fields, should be likewise included in the patent protection scope of the present invention.

The invention claimed is:

1. A lens module, comprising:
   a base having a bottom portion and an extension portion extending vertically along the bottom portion, with a stepped surface formed where the bottom portion connects with the extension portion, and an internal thread formed on an inner wall of the extension portion;
   an elastic element disposed on the stepped surface;
   an optical lens;
   an abutting member configured to be received in the extension portion of the base, disposed between the optical lens and the stepped surface, and fixed to the stepped surface; and
   a receiving element configured to receive the optical lens and comprising a threaded portion and a receiving portion connected with the threaded portion, the threaded portion comprising an external thread matching with the internal thread and connectable with the internal thread by threading to connect the receiving element with the base, wherein the elastic element abuts against the threaded portion to provide a pretightening force for the receiving element.

2. The lens module according to claim 1, wherein a sum of the height of the threaded portion along a direction perpendicular to the stepped surface and the height of the elastic element along the direction perpendicular to the stepped surface is greater than the height of the extension portion along the direction of the stepped surface.

3. The lens module according to claim 1, wherein both the bottom portion and the extension portion are ring-like, and the extension portion and the bottom portion are integrally formed.

4. The lens module according to claim 1, wherein the height of the abutting member along a direction perpendicular to the stepped surface is equal to a distance from the optical lens to the stepped surface, and a top surface of the abutting member away from the stepped surface abuts against the optical lens.

5. The lens module according to claim 1, further comprising:

multiple bolts, wherein the bottom portion of the base comprises multiple threaded holes, each of the holes corresponding to one of the bolts; and an outer wall of the abutting member comprising multiple threaded studs at positions corresponding to positions of the multiple threaded holes, wherein the multiple threaded bolts are connected with a respective one of the threaded studs by threading to fix the abutting member to the stepped surface.

6. The lens module according to claim 5, wherein two sides of each of the threaded holes comprise a positioning column respectively, and each of the threaded studs is located between two of the positioning columns.

7. The lens module according to claim 1, wherein the abutting member is fixed onto the stepped surface by glue.

8. The lens module according to claim 1, wherein an inner wall of the abutting member comprises an inclined face, the diameter of the inclined face gradually decreasing from one end away from the stepped surface to the other end close to the stepped surface, the inclined face comprising multiple decorative steps.

9. The lens module according to claim 8, wherein:
the bottom portion of the base comprises a circular first opening;
the abutting member comprises a hollow ring-like structure having a circular second opening, wherein the diameter of the second opening is less than that of the first opening;
the diameter of one end of the inclined face away from the stepped surface is greater than the diameter of the second opening and the diameter of the first opening, but is less than the inner diameter of the extension portion; and
the diameter of one end of the inclined face close to the stepped surface is less than the diameter of the second opening and the diameter of the first opening.

10. The lens module according to claim 1, wherein the elastic element abuts against the inner wall of the extension portion.

11. The lens module according to claim 1, wherein the elastic element is made of rubber.

12. The lens module according to claim 1, wherein one end of the receiving portion away from the threaded portion is provided with an opening, one end of the receiving portion close to the opening comprising a first receiving groove, the first receiving groove configured to receive the optical lens.

13. The lens module according to claim 12, wherein:
the end of the receiving portion close to the opening is further provided with a second receiving groove;
the first receiving groove is in communication with the second receiving groove; and
the lens module further comprises a gasket received in the second receiving groove and abutting against the optical lens.

14. The lens module according to claim 13, wherein the thickness of the optical lens is equal to the depth of the first receiving groove, and the thickness of the gasket is equal to the depth of the second receiving groove.

15. The lens module according to claim 13, wherein the gasket is made of a metal material and is provided with a notch.

16. The lens module according to claim 1, wherein the optical lens is a filter.

17. The lens module according to claim 1, wherein the lens module is disposed on an unmanned aerial vehicle.

* * * * *